June 28, 1927.

O. C. WILLIS ET AL 1,634,166

WRIST PIN

Filed Oct. 2, 1926

Orvis C. Willis
Oscar Cox
INVENTOR

BY Victor J. Evans
ATTORNEY

Patented June 28, 1927.

UNITED STATES PATENT OFFICE.

1,634,166

ORVIS C. WILLIS AND OSCAR COX, OF COTTON VALLEY, LOUISIANA.

WRIST PIN.

Application filed October 2, 1926. Serial No. 139,218.

This invention relates to machine elements and its primary object is to provide a wrist pin designed especially for rigs for oil wells, and said wrist pin includes threaded parts so constructed that they can be assembled and associated with a crank or the like without injury to the threads of the parts.

A further object of the invention is to provide a wrist pin that can be expeditiously removed or associated with a crank and the like with no injury to either, and with very little effort on the part of the operator.

Another object of the invention is to provide a wrist pin that is so constructed that it can be associated with a crank without fear of the pin becoming loose.

A still further object of the invention is to provide a wrist pin constructed to receive a pitman in a manner whereby the latter can be easily removed, but is so secured to said pin to prevent casual removal thereof.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which.

Figure 1:
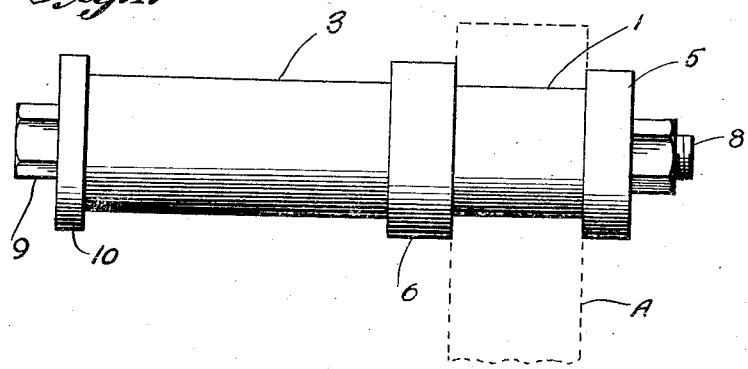
Figure 1 is a side elevation of the wrist pin which forms the subject matter of the present invention and showing the same applied to a crank which is shown in dotted lines.
Figure 2:
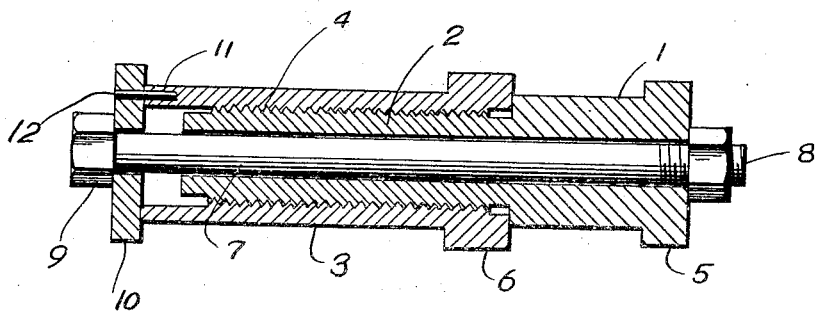
Figure 2 is a longitudinal sectional view taken through the pin per se.
Figure 3:
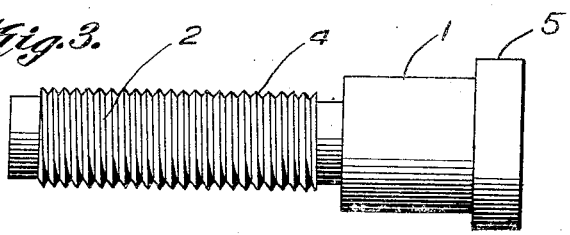
Figure 3 is a side elevation of one of the members of the pin.

Referring to the drawings in detail the letter A indicates a fragmentary portion of a crank which as shown in Figure 1 is received by the member 1 of our novel pin. The member 1 includes a body formed with an elongated projection 2 on one end thereof and said body is also provided with a longitudinal bore which extends through the projection 2 as shown in Figure 2 of the drawings. Associated with the member 1 is a member 3 which is in the nature of a sleeve and is provided with threads on its interior surface for the greatest portion of its length to accommodate the threads 4 formed on the projection 2 which receives the member 3 in the manner as clearly shown in Figure 2.

Formed on the body of the member 1 opposite the projection 2 is a flange 5, while the adjacent end of the member 3 is also provided with a flange 6 which together with the flange 5 and the body of the member 1 form a hub for the crank A.

Arranged in the bore of the body of the member 1 and its projection 2 is an elongated bolt 7 having a threaded end 8 adapted to receive a nut to bear against the flanged end of the member 1 while the opposite end of said bolt 7 is provided with a head 9 which is adapted to bear against the washer 10 for arranging said washer in secured position against the adjacent end of the member 3 so as to provide a hub for a pitman (not shown) and which is disposed between the flange 6 and the washer 10 as will be readily apparent. A recess 11 is formed in the last mentioned end of the member 3 and receives a pin 12 which passes through and is secured to the washer 10 so as to prevent rotation of the latter.

From the above description and disclosure of the drawings, it will be obvious that the member 1 can be quickly and easily associated with the crank A without injury to the threads 4 and the member 3 is threadedly secured to the projection 2 as shown, and in view of the fact that the threads are arranged left handed, they will always retain the respective members 1 and 3 in operative association, and the bolt 7 co-operates with the threads to accomplish this purpose. The bolt 7 also serves to secure the washer 10 against the member 3, and the wrist pin which includes all the parts as above set forth may be readily assembled to the crank and pitman in an expeditious manner without fear of casual displacement of any of the parts or removal thereof.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:

1. A wrist pin of the character described comprising a member including a body, a threaded projection formed on said body and being provided with a bore aligned with a bore in the body, a second member formed with threads on its interior surface and adapted to receive the threaded projection for associating said members in alignment, flanges formed on said members and together with the body of the first mentioned member provide a hub for receiving a crank, a washer and means passing through said bores, washer and the second member respectively for securing the washer against the outer end of the second mentioned member and cooperating with the threads for holding said members associated.

2. A wrist pin of the character described comprising a member including a body, a flange formed on one end of said body, a threaded projection formed on the opposite end, a second member provided with threads on its interior surface to accommodate the threads of the projection, a flange formed on said second member and cooperating with the body and flange thereof respectively to provide a hub to accommodate a crank, a headed bolt passing through said members, a washer received by said bolt, and a nut for said bolt for arranging the head of the bolt against said washer for holding the latter in contacting engagement with one end of the second mentioned member whereby the second mentioned member, its collar and washer respectively provide a hub for a pitman.

In testimony whereof we affix our signatures.

ORVIS C. WILLIS.
OSCAR COX.